(12) United States Patent
Nam et al.

(10) Patent No.: US 12,238,680 B2
(45) Date of Patent: Feb. 25, 2025

(54) SIDELINK ASSISTED MULTI-LINK COMMUNICATION

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 16/942,342

(22) Filed: Jul. 29, 2020

(65) Prior Publication Data

US 2021/0037503 A1    Feb. 4, 2021

Related U.S. Application Data

(60) Provisional application No. 62/882,419, filed on Aug. 2, 2019.

(51) Int. Cl.
*H04W 72/02*      (2009.01)
*H04W 16/28*      (2009.01)
(Continued)

(52) U.S. Cl.
CPC .......... *H04W 72/02* (2013.01); *H04W 16/28* (2013.01); *H04W 72/0446* (2013.01); *H04W 72/23* (2023.01); *H04W 92/18* (2013.01)

(58) Field of Classification Search
CPC . H04W 72/02; H04W 72/23; H04W 72/0446; H04W 16/28; H04W 92/18
See application file for complete search history.

(56) References Cited

U.S. PATENT DOCUMENTS

2011/0243060 A1*   10/2011   Mildh .................. H04W 72/23
                                                       370/315
2017/0289995 A1*   10/2017   Lin ....................... H04W 72/23
(Continued)

FOREIGN PATENT DOCUMENTS

CN         106576354 A      4/2017
WO      2016186995 A1    11/2016

OTHER PUBLICATIONS

3GPP RAN WG1 Chairman Wanshi Chen: "Status Report for RAN WG1 to TSG-RAN #82" 3GPP Draft, 3GPP TSG RAN #82, RP-182186 RAN1 SR RAN#82, 3rd Generation Partnership Project (3GPP), Mobile Competence Centre, 650, Route Des Lucioles, F-06921, Sophia-Antipolis Cedex, France, vol. TSG RAN, No. Sorrento, Italy; Dec. 10, 2018-Dec. 13, 2018, Dec. 9, 2018 (Dec. 9, 2018), XP051551585, 30 pages.
(Continued)

*Primary Examiner* — Rhonda L Murphy
(74) *Attorney, Agent, or Firm* — ArentFox Schiff LLP

(57) ABSTRACT

Aspects described herein relate to sidelink-assisted virtual multi-link. In one aspect, for example, a relay node may serve as an additional virtual antenna panel for a UE by receiving downlink data from a base station via an access link, or receiving uplink data from the UE via a sidelink. The relay node may forward the downlink data to the UE via sidelink, or the uplink data to the base station via the access link. In another aspect, a base station may determine, for a UE, quasi-colocation (QCL) information and a grant for one or both of one or more access link resources or one or more sidelink resources. The base station may further transmit, to the UE, the QCL information and the grant on a downlink communication channel.

18 Claims, 12 Drawing Sheets

(51) Int. Cl.
　　*H04W 72/0446*　　(2023.01)
　　*H04W 72/23*　　(2023.01)
　　*H04W 92/18*　　(2009.01)

(56) References Cited

U.S. PATENT DOCUMENTS

| | | | |
|---|---|---|---|
| 2018/0069618 | A1 | 3/2018 | Loehr et al. |
| 2018/0146494 | A1* | 5/2018 | Khoryaev ............. H04W 76/15 |
| 2021/0127396 | A1* | 4/2021 | Su ......................... H04L 5/0012 |
| 2021/0321267 | A1* | 10/2021 | Kim ..................... H04B 7/0408 |
| 2022/0217698 | A1* | 7/2022 | Lee ....................... H04L 1/1864 |

OTHER PUBLICATIONS

Ericsson: "Feature Lead Summary#2 on Evaluation of Uu for Advanced V2X Use Cases," 3GPP Draft, 3GPP TSG-RAN WG1 Meeting #95, R1-1814107—Feature Lead Summary AI 7.2.4.2 V2.0, 3rd Generation Partnership Project (3GPP), Mobile Competence Centre, 650, Route Des Lucioles, F-06921, Sophia-Antipolis Cedex, France, vol. RAN WG1, No. Spokane, WA, USA, Nov. 12, 2018-Nov. 16, 2018, Nov. 19, 2018 (Nov. 19, 2018), XP051494560, 6 pages.

Huawei, et al., "Beamforming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593708, 5 pages.

International Search Report and Written Opinion—PCT/US2020/044345—ISA/EPO—Nov. 20, 2020.

Pabst R., et al., "Fixed Relays for Next Generation Wireless Systems System Concept and Performance Evaluation", Journal of Communications and Networks, New York, NY, USA, IEEE, US, vol. 7, No. 2, Jun. 1, 2005 (Jun. 1, 2005), pp. 104-114, XP011483469, ISSN: 1229-2370, DOI: 10.1109/JCN.2005.6387858, paragraph [0001]; figure 1.

Partial International Search Report—PCT/US2020/044345—ISA/EPO—Sep. 30, 2020.

* cited by examiner

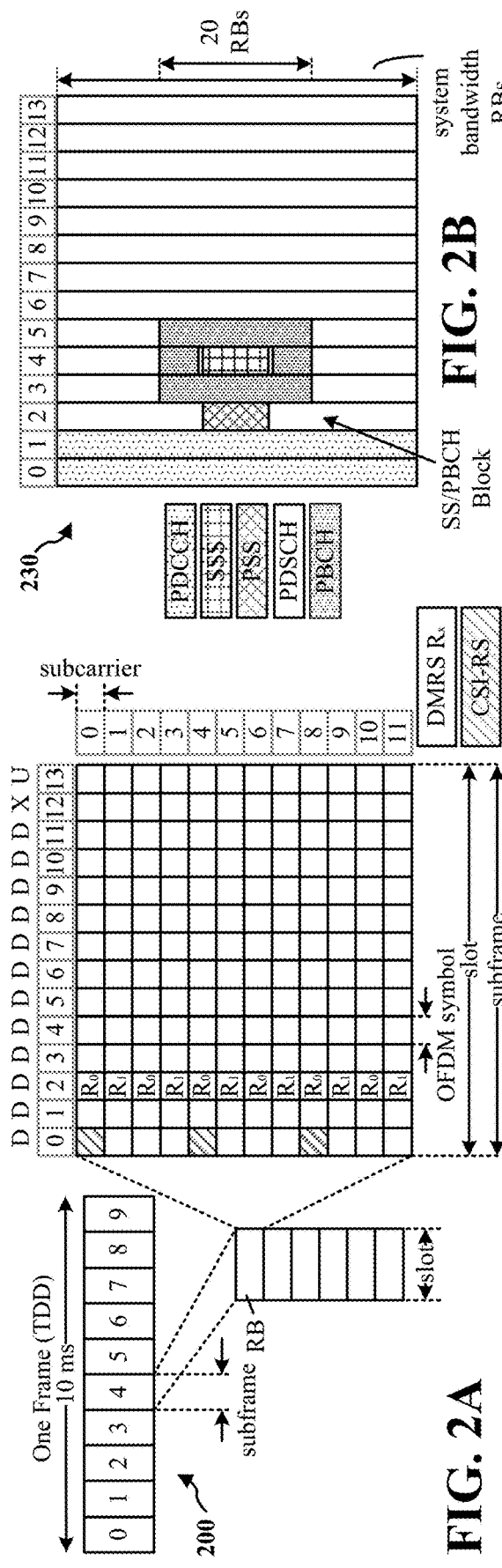
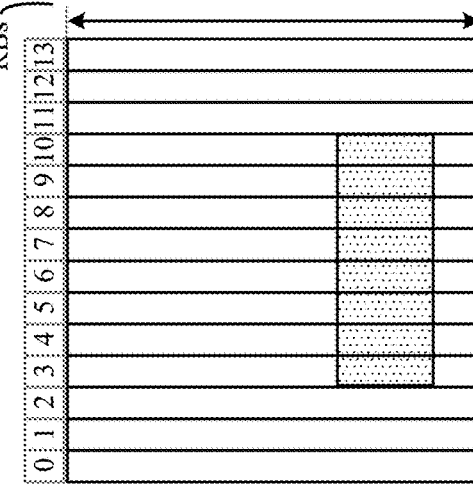
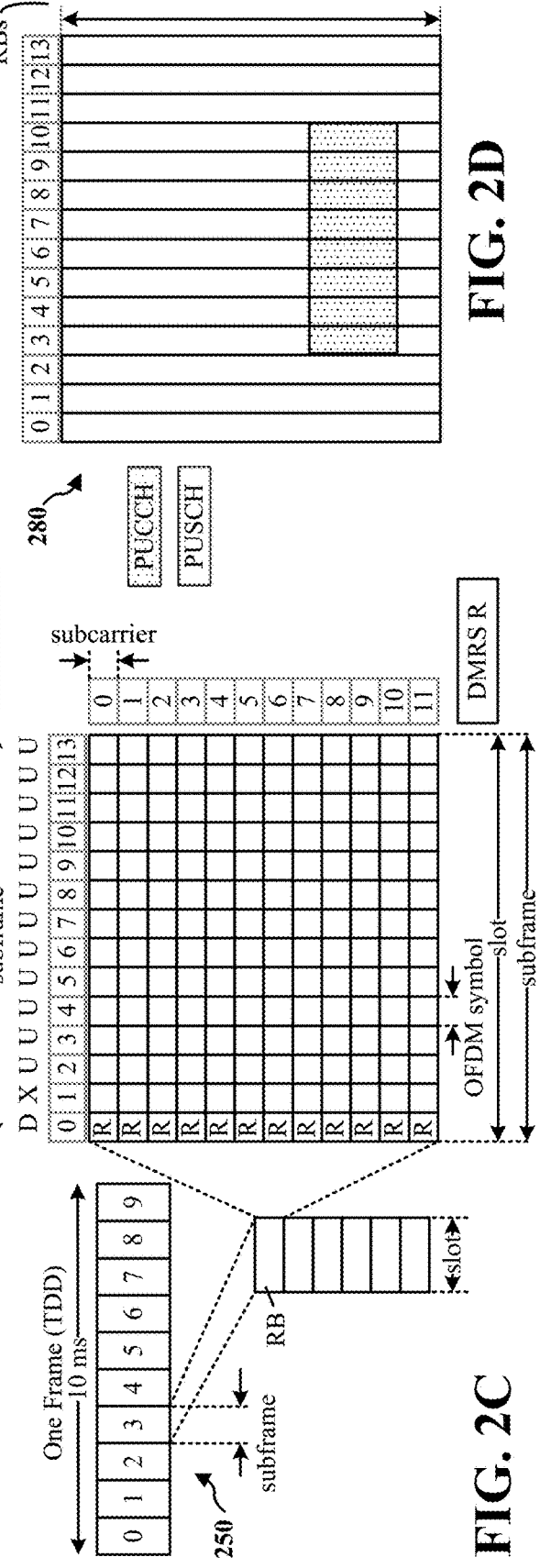
FIG. 2A
FIG. 2B
FIG. 2C
FIG. 2D

1000

1002

Determine, for a UE, QCL information and a grant for one or both of one or more access link resources or one or more sidelink resources

1004

Transmit, to the UE, the QCL information and the grant on a downlink communication channel

FIG. 10

SIDELINK ASSISTED MULTI-LINK COMMUNICATION

CROSS-REFERENCE TO RELATED APPLICATION(S)

The application claims the benefit of U.S. Provisional Application Ser. No. 62/882,419, entitled "SIDELINK ASSISTED MULTI-LINK COMMUNICATION" and filed on Aug. 2, 2019, which is expressly incorporated by reference herein in its entirety.

BACKGROUND

The present disclosure relates generally to communication systems, and more particularly, to sidelink assisted multi-link communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communications by a relay node is provided. The method may include receiving, from a base station, a grant for one or both of one or more access link resources or one or more sidelink resources. The method may further include receiving data from at least one of the base station on an access link using the one or more access link resources, or a user equipment (UE) on a sidelink using the one or more sidelink resources. The method may further include forwarding the data to at least one of the UE using the one or more sidelink resources when received from the base station on the access link using the one or more access link resources, or the base station using the one or more access link resources when received from the UE on the sidelink using the one or more sidelink resources.

In a further aspect, the present disclosure includes an apparatus for wireless communication including a memory and at least one processor coupled to the memory. The at least one processor may be configured to receive, from a base station, a grant for one or both of one or more access link resources or one or more sidelink resources. The at least one processor may be configured to receive data from at least one of the base station on an access link using the one or more access link resources, or a UE on a sidelink using the one or more sidelink resources. The at least one processor may be configured to forward the data to at least one of the UE using the one or more sidelink resources when received from the base station on the access link using the one or more access link resources, or the base station using the one or more access link resources when received from the UE on the sidelink using the one or more sidelink resources.

In an additional aspect, the present disclosure includes an apparatus for wireless communication including means for receiving, from a base station, a grant for one or both of one or more access link resources or one or more sidelink resources. The apparatus may further include means for receiving data from at least one of the base station on an access link using the one or more access link resources, or a UE on a sidelink using the one or more sidelink resources. The apparatus may further include means for forwarding the data to at least one of the UE using the one or more sidelink resources when received from the base station on the access link using the one or more access link resources, or the base station using the one or more access link resources when received from the UE on the sidelink using the one or more sidelink resources.

In yet another aspect, the present disclosure includes a non-transitory computer-readable medium storing computer executable code, the code when executed by a processor cause the processor to receive, from a base station, a grant for one or both of one or more access link resources or one or more sidelink resources, receive data from at least one of the base station on an access link using the one or more access link resources, or a UE on a sidelink using the one or more sidelink resources, and forward the data to at least one of the UE using the one or more sidelink resources when received from the base station on the access link using the one or more access link resources, or the base station using the one or more access link resources when received from the UE on the sidelink using the one or more sidelink resources.

According to another example, a method of wireless communications by a base station is provided. The method may include determining, for a UE, quasi-colocation (QCL) information and a grant for one or both of one or more access link resources or one or more sidelink resources. The method may further include transmitting, to the UE, the QCL information and the grant on a downlink communication channel.

In a further aspect, the present disclosure includes an apparatus for wireless communication including a memory and at least one processor coupled to the memory. The at least one processor may be configured to determine, for a UE, QCL information and a grant for one or both of one or more access link resources or one or more sidelink resources. The at least one processor may be configured to transmit, to the UE, the QCL information and the grant on a downlink communication channel.

In an additional aspect, the present disclosure includes an apparatus for wireless communication including means for determining, for a UE, QCL information and a grant for one or both of one or more access link resources or one or more sidelink resources. The apparatus may further include means for transmitting, to the UE, the QCL information and the grant on a downlink communication channel.

In yet another aspect, the present disclosure includes a computer-readable medium storing computer executable code, the code when executed by a processor cause the processor to determine, for a UE, QCL information and a grant for one or both of one or more access link resources or one or more sidelink resources, and transmit, to the UE, the QCL information and the grant on a downlink communication channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1.

FIG. 10 is a flowchart of another example method of wireless communication of a base station operable in the system of FIG. 1.

DETAILED DESCRIPTION

Figure 1:
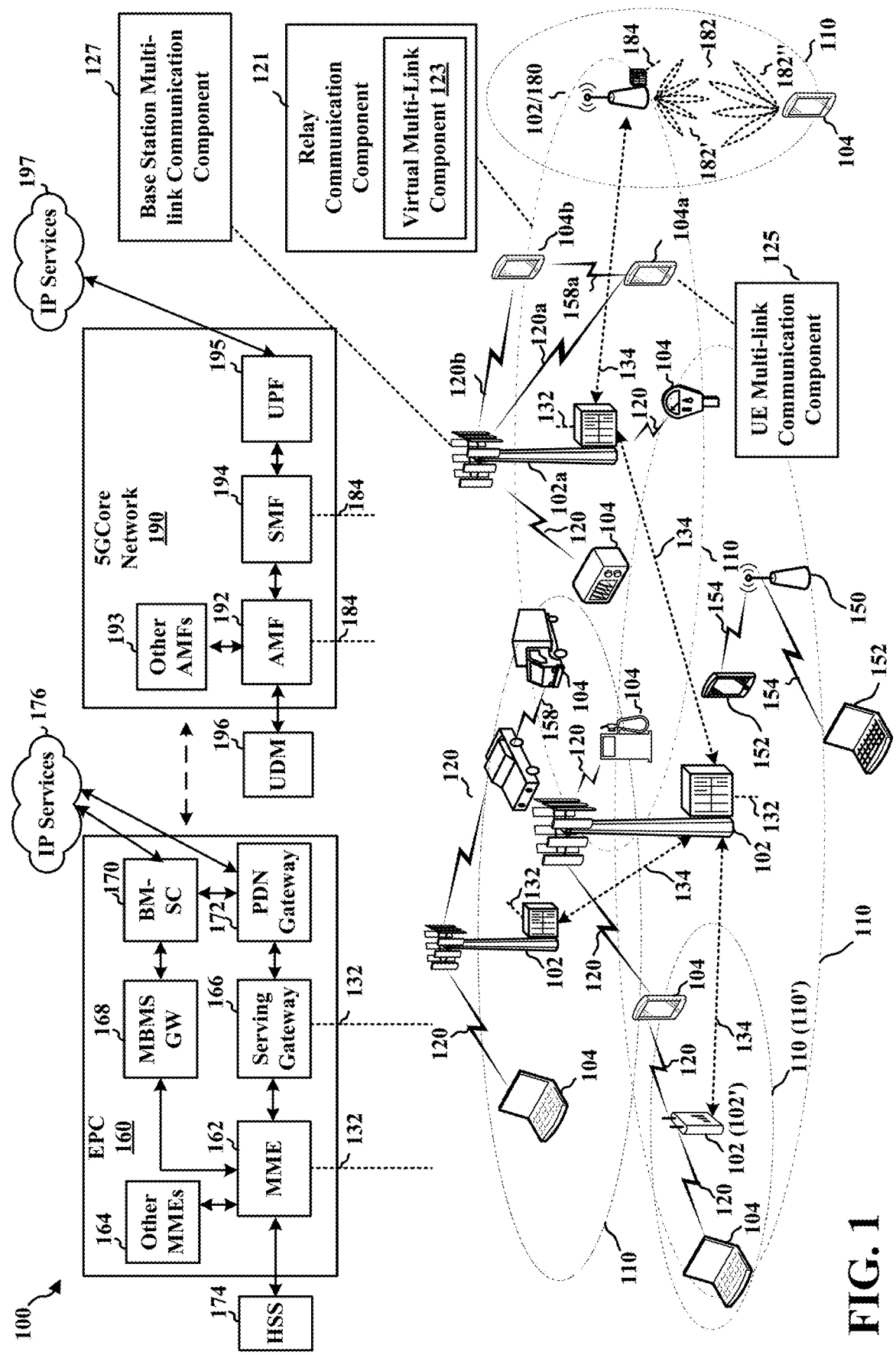
FIG. 1 is a schematic diagram of an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink relay communications, which includes a relay user equipment (UE) relaying communications from a base station over a sidelink to a UE, or from UE to the base station via the relay UE. Device-to-device (D2D) connectivity may be supported in some wireless communication systems (e.g., Long Term Evolution (LTE) and/or New Radio (NR)). In some aspects, application of D2D may include vehicle-to-everything (V2X), sensor networks, public-safety-related communication services with limited infrastructure availability. Further, in some wireless communication systems (e.g., NR), multi-link communication may be supported for improved diversity and throughput. For example, in millimeter wave (mmW) systems, multi-link communication may be altered using multiple transmission and/or reception beams and multiple antenna panels (e.g., sub-arrays).

In an example, one or both of a destination UE and the relay UE may further include a direct access link to the base station. Specifically, the access link may be a communication link between a UE and a base station (e.g., gNB), also referred to as a Uu interface (DL/UL) in LTE or NR. Further, a sidelink may be a communication link between UEs, also referred to as a ProSe 5 (PC5) interface in LTE or NR. In some aspects, from a UE perspective, topologies of multi-link communications and sidelink relaying may be similar. However, unlike some other destination UEs that may be able to establish multi-link communication with one or more base stations over two or more communication links, the destination UE may include a single antenna panel, whereby multi-link and/or multi transmit/reception points (TRPs) communication is not supported. In such a case, sidelink relaying may be used to implement a virtual multi-link communication. That is, a relay node may serve as an additional virtual antenna panel for the destination UE. Such multi-link communications are desirable, for example, to increase diversity and/or to increase throughput.

Specifically, present disclosure relates to enhancements to the sidelink relay communication scenario, and in particular, to sidelink-assisted multi-link communication. The present disclosure provides apparatus and methods in which the relay UE may receive, from a base station, a grant for one or both of one or more access link resources or one or more sidelink resources. The relay UE may further receive data from at least one of the base station on an access link using the one or more access link resources, or the sidelink-assisted multi-link UE on a sidelink using the one or more sidelink resources. The relay UE may further forward the data to at least one of the UE using the one or more sidelink resources when received from the base station on the access link using the one or more access link resources, or the base station using the one or more access link resources when received from the UE on the sidelink using the one or more sidelink resources.

In another implementation, the present disclosure provides apparatus and methods in which the base station determines, for a UE, quasi-colocation (QCL) information and a grant for one or both of one or more access link resources or one or more sidelink resources. The base station may further transmit, to the UE, the QCL information and the grant on a downlink communication channel.

These and other features of the present disclosure are discussed in detail below with regard to FIGS. 1-11.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a relay UE 104b may include a relay communication component 121 for assisting with sidelink relay communications between a base station 102a and a destination UE 104a. The destination UE 104a may have a first access link 120a directly with the base station 102a, and a second communication link with the base station 102a via a sidelink 158a with the relay UE 104, which has a second access link 120b to the base station 102a. The relay communication component 121 of the relay UE 104b may include a virtual multi-link component 123, which may be selectively configured to serve as an additional virtual antenna panel for the destination UE 104a by receiving downlink data from the base station 102a via the second access link 120b, or uplink data from the sidelink-assisted multi-link UE 104a via the sidelink 158a, and forwarding the downlink data to the destination UE 104a via the sidelink 158a, or the uplink data to the base station 102a via the access link 120b.

Correspondingly, the destination UE 104a may include a UE multi-link communication component 125 configured to manage communications with both the relay UE 104b via the sidelink 158a and the base station 102a via the access link 120a.

Similarly, the base station 102a may include a base station multi-link communication component 127 configured to manage communications with both the relay UE 104b via the access link 120b and the sidelink-assisted multi-link UE 104a via the access link 120a.

Further details of these sidelink relay operational modes and operations performed by the relay UE 104b, the destination UE 104a, and the base station 102a are discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including relay UE 104b and sidelink-assisted multi-link UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (S Cell).

Certain UEs 104, such as relay UE 104b and destination UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in mmW frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a TRP, or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_X$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
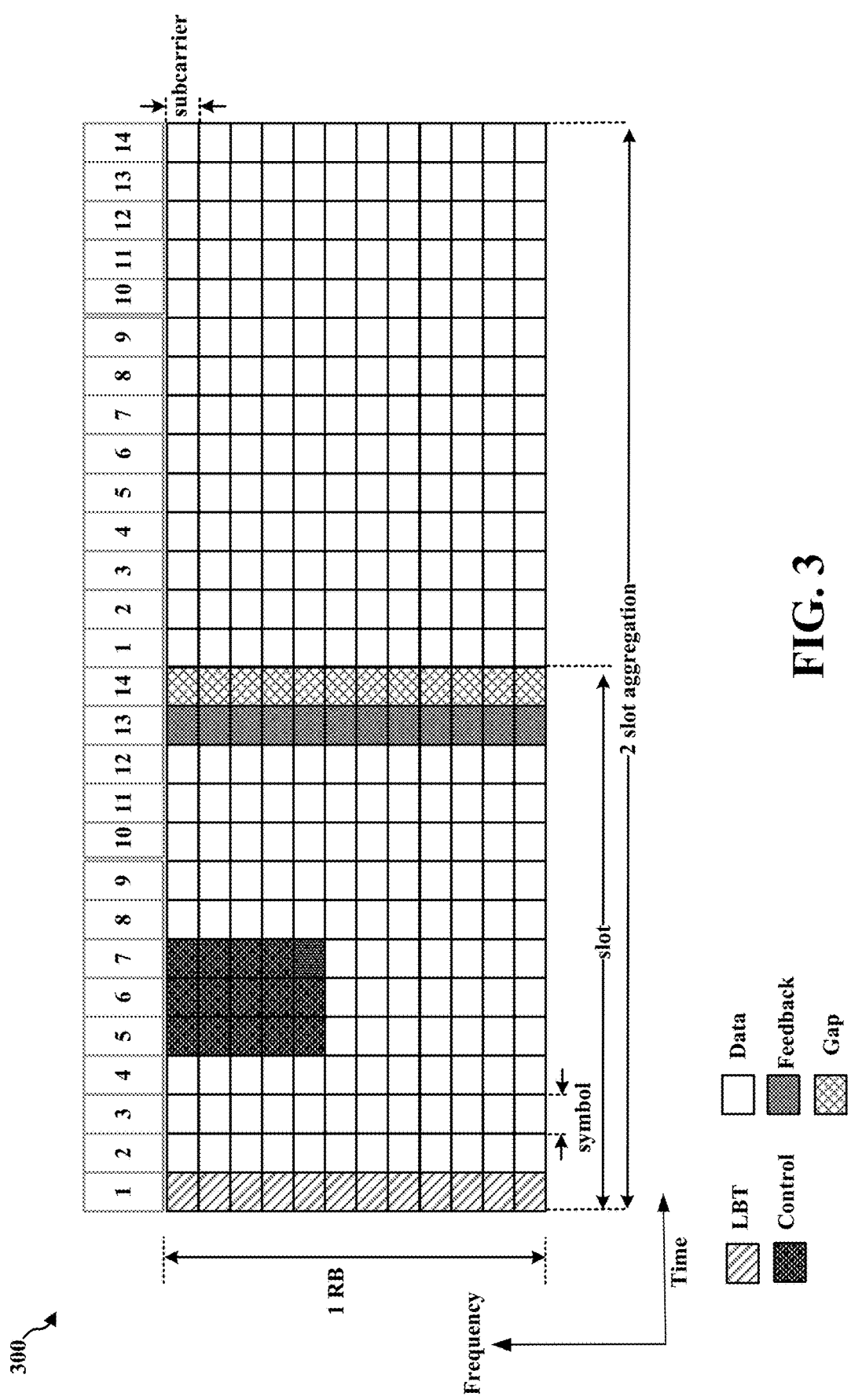
FIG. 3 is a diagram of an example frame structure and resources for sidelink communications between two of the communicating nodes in the system of FIG. 1.

FIG. 3 is a diagram 300 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
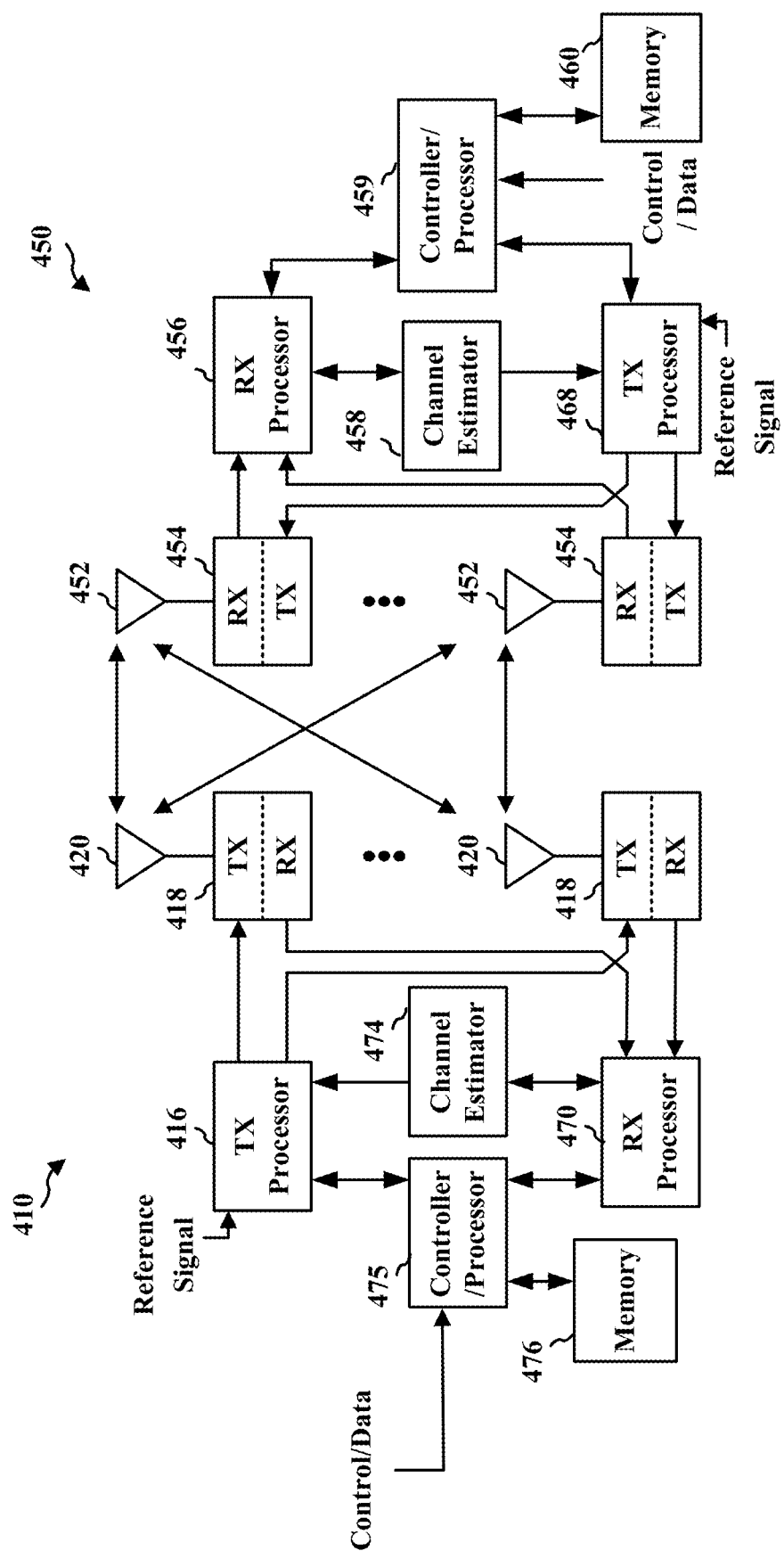
FIG. 4 is a schematic diagram of an example of hardware components of two of the communicating nodes in the system of FIG. 1.

FIG. 4 is a diagram of hardware components of an example transmitting and/or receiving (tx/rx) nodes 410 and 450, which may be any combinations of base station 102-UE 104 communications, and/or UE 104-UE 104 communications in system 100. For example, such communications may including, but are not limited to, communications such as a base station transmitting to a relay UE, a relay UE transmitting to a destination UE, a destination UE transmitting to a relay UE, or a relay UE transmitting to a base station in an access network. In one specific example, the tx/rx node 410 may be an example implementation of base station 102 and where tx/rx node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the tx/rx node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the tx/rx node 450. If multiple spatial streams are destined for the tx/rx node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the tx/rx node 410. These soft decisions may be based on channel estimates computed by the channel estimator 458. The soft decisions are then decoded and deinterleaved to recover the data and control signals that were originally transmitted by the tx/rx node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the tx/rx node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the tx/rx node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the tx/rx node 410 in a manner similar to that described in connection with the receiver function at the tx/rx node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, 125, and/or 127 of FIG. 1.

In an implementation, at least one of the TX processor 416, the RX processor 470, and the controller/processor 475 may be configured to perform aspects in connection with components 121, 125, and/or 127 of FIG. 1.

Figure 5:
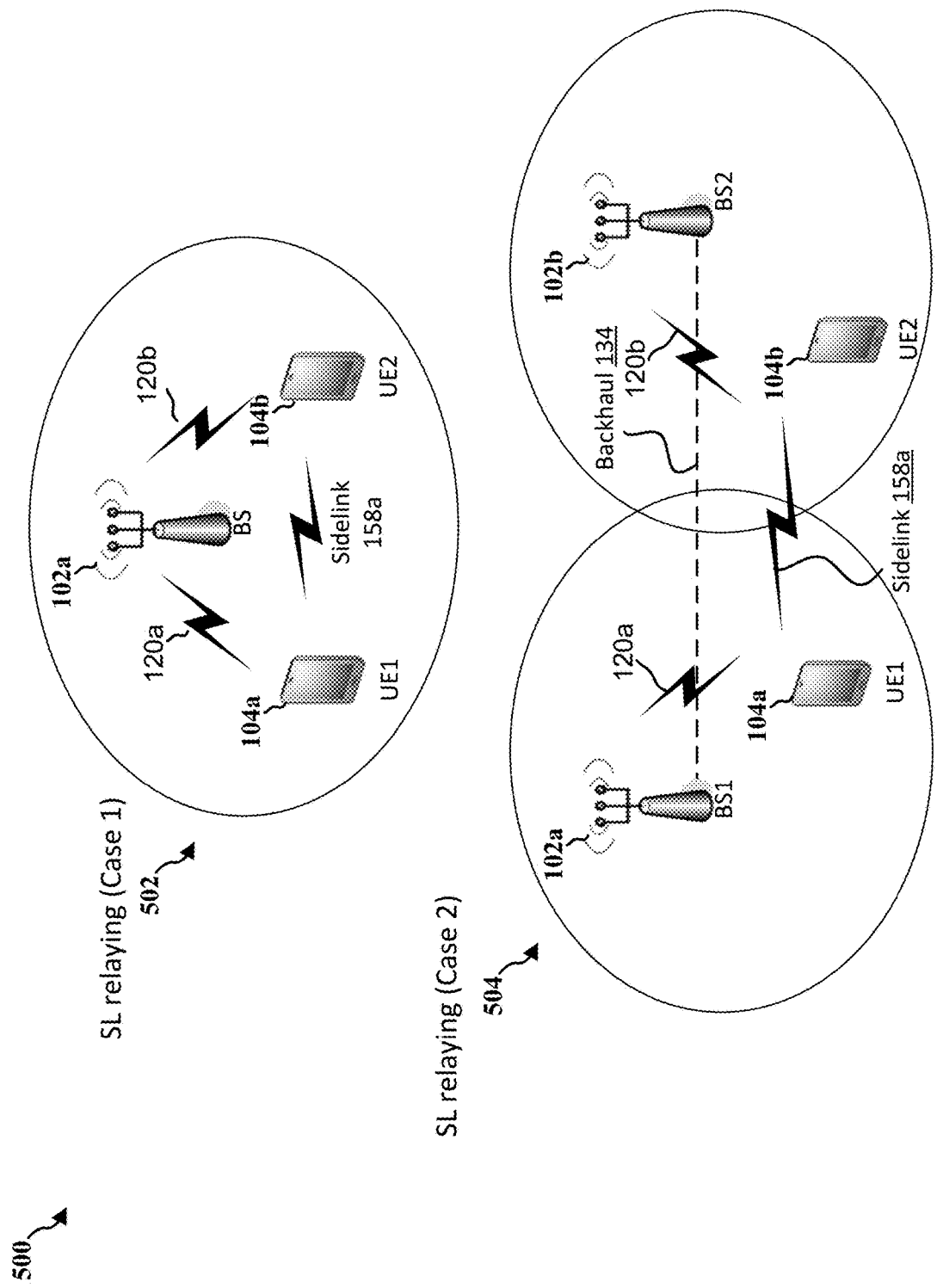
FIG. 5 is a schematic diagram of two different examples of a sidelink relay communication configuration operable in the system of FIG. 1.
Figure 6:
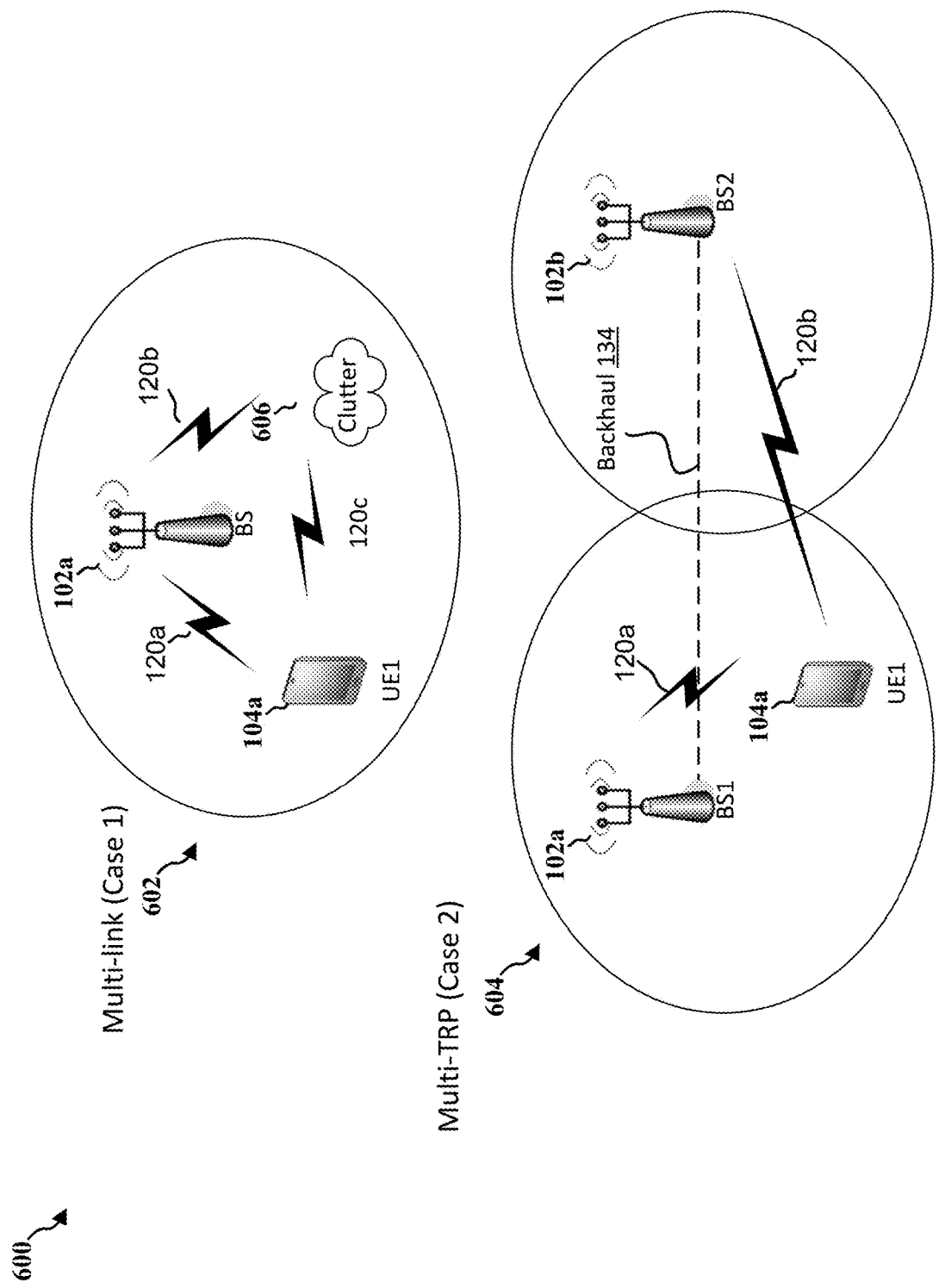
FIG. 6 is a schematic diagram of two different examples of a multi-link communication configuration operable in the system of FIG. 1.
Figure 7:
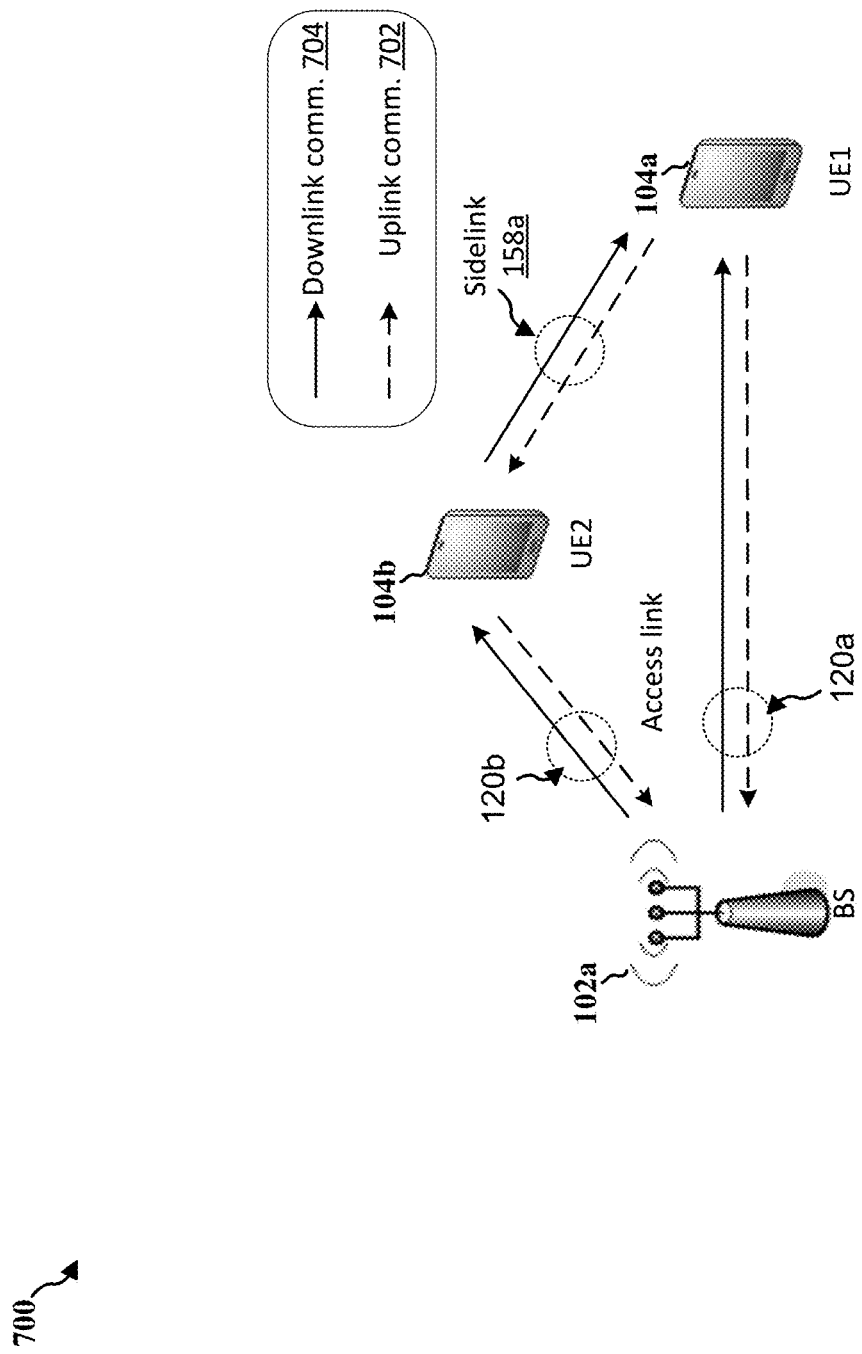
FIG. 7 is a schematic diagram of an example of a sidelink relay communication configuration operable in the system of FIG. 1.

Referring to FIGS. 5, 6, and 7 the present aspects generally relate to a relay communication scenario 500, 600, and 700 that includes relaying communications over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink relay communication scenario 500, a sidelink-assisted multi-link UE 104a may establish a multi-link communication with one or more base stations 102a and/or 102b over two or more communication links, which include at least one direct link and at least one indirect link via a sidelink with a relay UE 104b. In a first case, such as in the sidelink relay communication scenarios 500 and 652, the sidelink-assisted multi-link UE 104a directly communicates with the base station 102a via a first access link (AL) 120a, and indirectly communicates with the base station 102a via a sidelink 158a with the relay UE 104b, which has a second access link 120b with the base station 102a.

In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a PC5 interface in 4G LTE and/or in 5G NR technologies. In any case, the sidelink relay communication scenario 500, 502, and/or 504 may be utilized for improved diversity, e.g., sending the same data over two links (access link and sidelink), and/or improved throughput, e.g., sending different, independent data over each link. In an implementation, in a mmW system, this type of multi-link communication may be attained using multiple transmit/receive beams and multiple antenna panels (sub-arrays) between the UEs and/or between a respective UE and a respective base station/gNB.

Further, in a second case, such as in the sidelink relay communication scenario 504, the sidelink-assisted multi-link UE 104a may establish multiple links with multiple base stations 102a and 102b, which may be referred to as a multi-TRP architecture. In this case, the sidelink-assisted multi-link UE 104a directly communicates with the base station 102a via a first access link (AL) 120a, and indirectly communicates with the base station 102b via a sidelink 158a with the relay UE 104b, which has a second access link 120b with the base station 102b. Additionally, in this case, the base stations 102a and 102b may exchange communications over a backhaul link 134a.

In the multi-link communication scenario 600, the communications, a multi-link UE 104a may establish a multi-link communication with one or more base stations 102a and/or 102b over two or more communication links, which include at least one access link (AL) to each of the base stations 102a and/or 102b. In a first case, such as in the multi-link communication scenarios 600 and 602, the multi-link UE 104a directly communicates with the base station 102a via a first access link (AL) 120a, and may indirectly communicate with the base station 102a via another access link (AL) with reflection at a radio clutter 606, which comprised reflection paths 120b and 120c. For example, the clutter 606 can be any object that can reflect/scatter radio waves, such as building surfaces, road signs, ground surface, etc. In general, an access link such as access link 120a or 120b/c is a communication link between a respective UE and a respective base station (or gNB), which may also be referred to as a Uu interface in 4G LTE and/or in 5G NR technologies. In any case, the multi-link communication scenario 600, 602, and/or 604 may be utilized for improved diversity, e.g., sending the same data over two separate links, and/or improved throughput, e.g., sending different, independent data over each link.

Further, in a second case, such as in the multi-link communication scenario 604, the multi-link UE 104a may establish multiple links with multiple base stations 102a and 102b, which may be referred to as a multi-transmit-receive point (multi-TRP) architecture. In this case, the multi-link UE 104a directly communicates with the base station 102a via a first access link (AL) 120a, and directly communicate with the base station 102b via another access link 120b. Additionally, in this case, the base stations 102a and 102b may exchange communications over a backhaul link 134a. In an implementation, in a mmW system, this type of multi-link communication may be attained using multiple transmit/receive beams and multiple antenna panels (sub-arrays) between the UEs and/or between a respective UE and a respective base station/gNB.

Additionally, in the sidelink relay communication scenario 500 and/or multi-link communication scenario 600, the communications exchanged between the base station 102a/102b, relay UE 104b, and sidelink-assisted multi-link UE 104a may be uplink (UL) communications 702 and/or downlink (DL) communications 704 (see FIG. 7).

Figure 8:
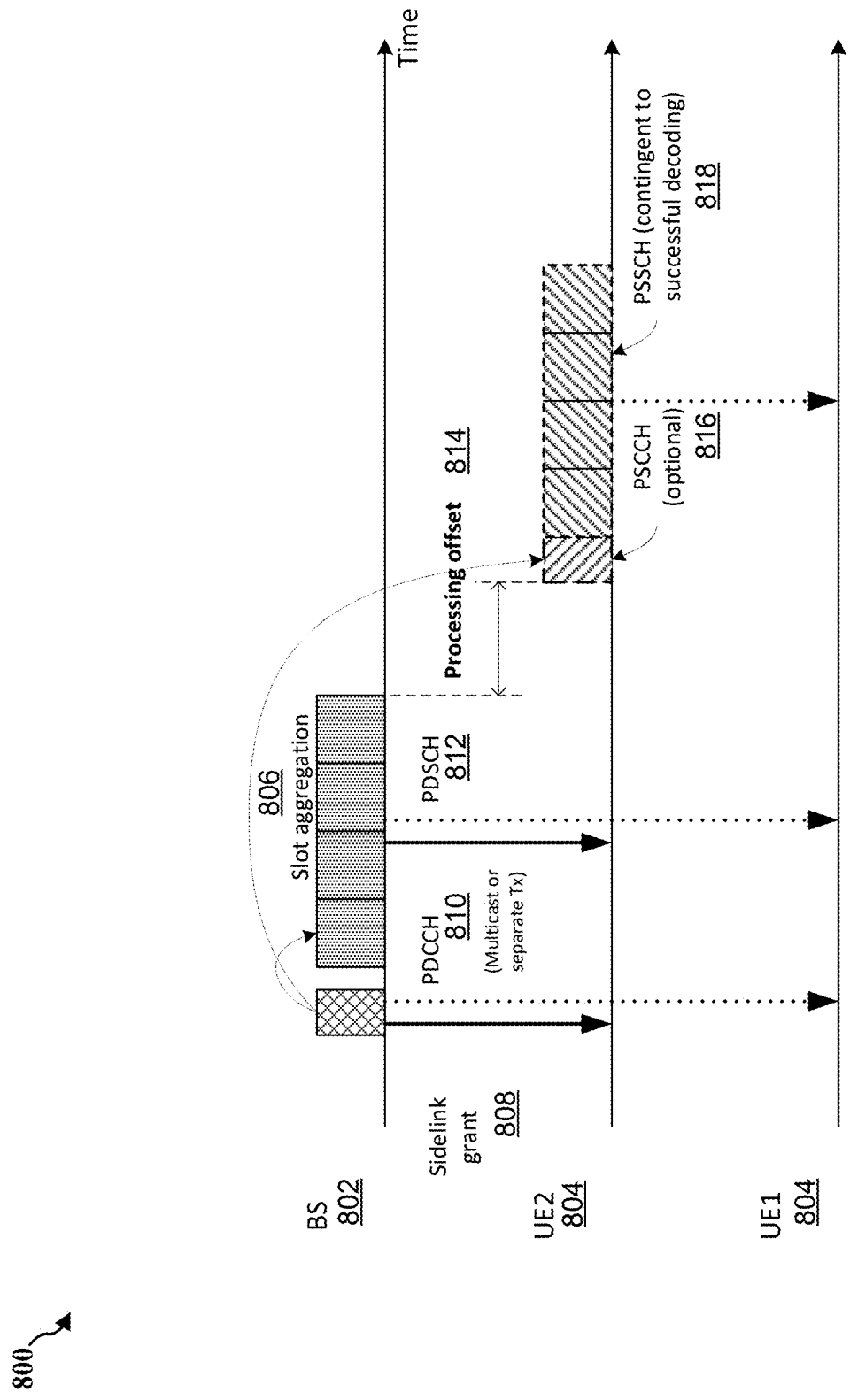
FIG. 8 is a schematic diagram of an example resource allocation scheme operable in the system of FIG. 1.

Referring to FIG. 8, a resource allocation scheme 800 may support sidelink-assisted virtual multi-link. For example, base station (BS) 802 may be the same as or similar to base station 102. The second UE (UE2) may be the same as or similar to relay UE 104b, and the first UE (UE1) may correspond to sidelink-assisted multi-link UE 104a. For example, UE1 may have one or more sidelinks established with one or more relay UEs such as UE2. For the DL/UL data transmission between BS 802 and UE1 804, slot-aggregation and/or multi-slot scheduling grant 808, which allocates at least one slot 806 in the access link and at least one slot 818 in the side link, may be used.

The grant 808 may be a semi-persistent and/or configured grant, or a dynamic grant given by a control channel (PDCCH 810). A processing offset 814 between the access link slots and the sidelink slots may provide processing time at the relay UEs such as UE2. The slots for sidelink may contain resource SCI (e.g., via PSCCH 816). The aggregated slots for both PDSCH 812 and PSSCH 818 may be used to transmit data according to the allocated resources on the access link or sidelink, respectively.

In one example, a relay UE or node (e.g., UE2 804) may receive a grant (e.g., either implicit or explicit) for access link and sidelink resources from BS 802. On the access link resource, relay UE (e.g., UE2) may receive data from the BS (BS 802) or UE (UE1) (UL relaying). On the sidelink resources, relay UE (UE2) may forward the data received on the access link (e.g., potentially in a modified format) to the destination node (e.g., BS 802 or UE1 804). Relaying may be contingent on the relay UE's (UE2) successful decoding of the access link. If the relay UE (UE2) fails in decoding data on the access link, the relay UE may skip relaying. If the SCI can be delivered to the destination node, the relay UE may notify the destination node of the decoding failure event.

In another example, a joint QCL indication may be transmitted to the destination UE (UE1). Specifically, transmission configuration indication (TCI) state/spatial relation can be configured as a combination of one or more QCL source reference signals on different links, such as access link reference signals (AL-RS(s)) and sidelink reference signals (SL-RS(s)). The base station (e.g., BE 802), along with the access link and sidelink grant, may send joint access link-sidelink QCL information to destination UE (e.g., UE1 804). For example, the joint QCL information may indicate the transmission and/or reception beams that the UE may use for access link and sidelink transmission and/or reception.

Further, synchronization signal block (SSB)/channel state information reference signal (CSI-RS) may become a DL/UL QCL sources and the sounding reference signal (SRS) may become UL QCL source. Specifically, the SL-RS may become a SL QCL source. Further, instead of SL-RS, SL UE's identifiers may be indicated, and the actual beam for sidelink communication between the UE and the identified SL UE may be implicitly determined (e.g., maintenance and selection SL beam may be up to UEs).

A sequence of joint TCI states/spatial relations may be configured and/or indicated for sweeping. For example, beam sweeping (one or more beams per link) and link sweeping (one or more links, e.g., AL and one or more SL(s)) over aggregated slots. With the scheduling DCI, only the index of the starting TCI state in the configured sequence may be indicated, and the TCI state for each aggregated slot may follow the order in the sequence with cycling. For semi-persistent scheduling and/or configured grant (e.g., for UL communication without dynamic scheduling by PDCCH), the TCI state for each aggregated slot may follow the order in the sequence starting from a fixed or pre-configured position, e.g., the first entry of the sequence.

Figure 9:
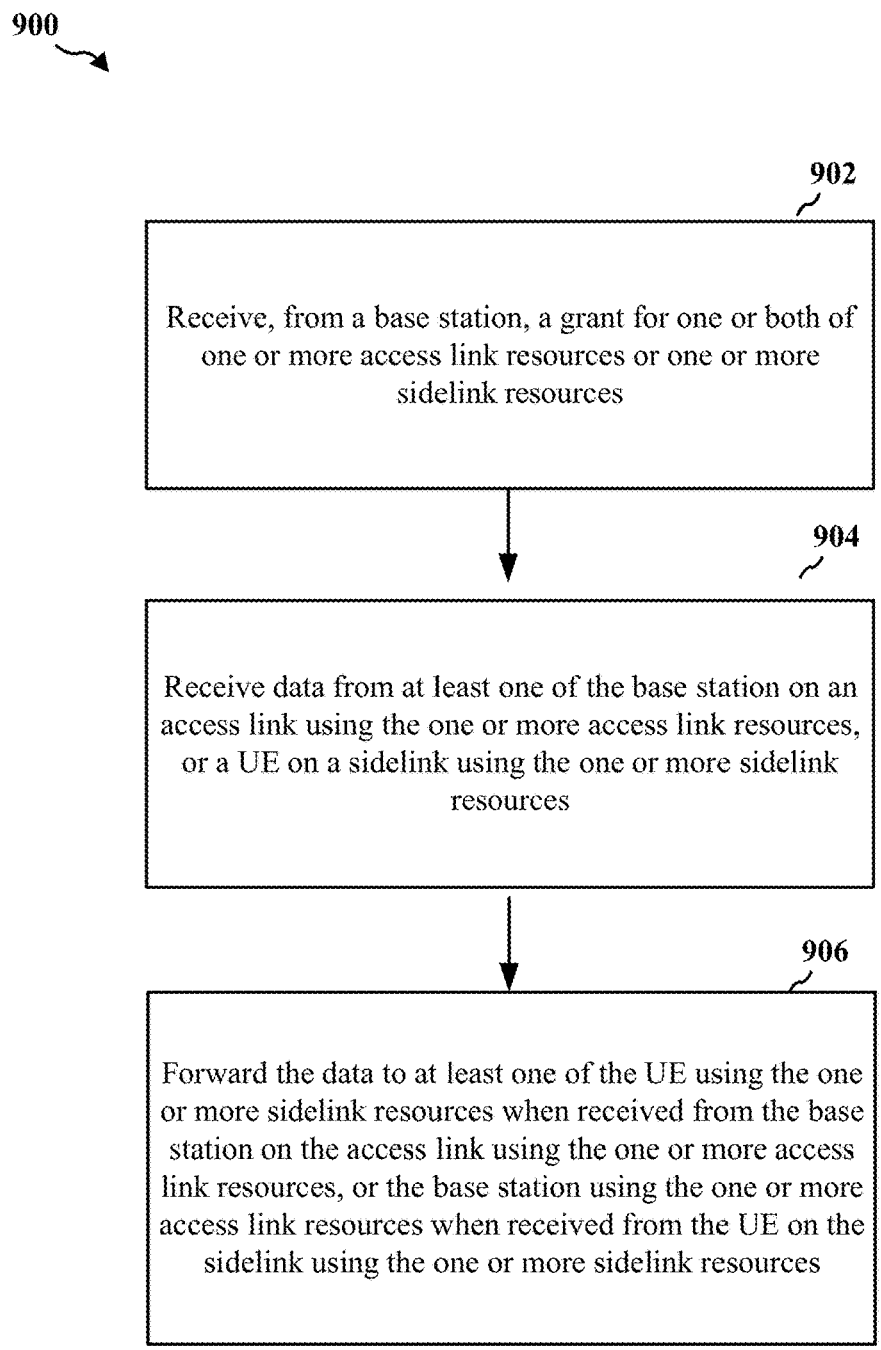
FIG. 9 is a flowchart of an example method of wireless communication of a relay UE operable in the system of FIG. 1.
Figure 11:
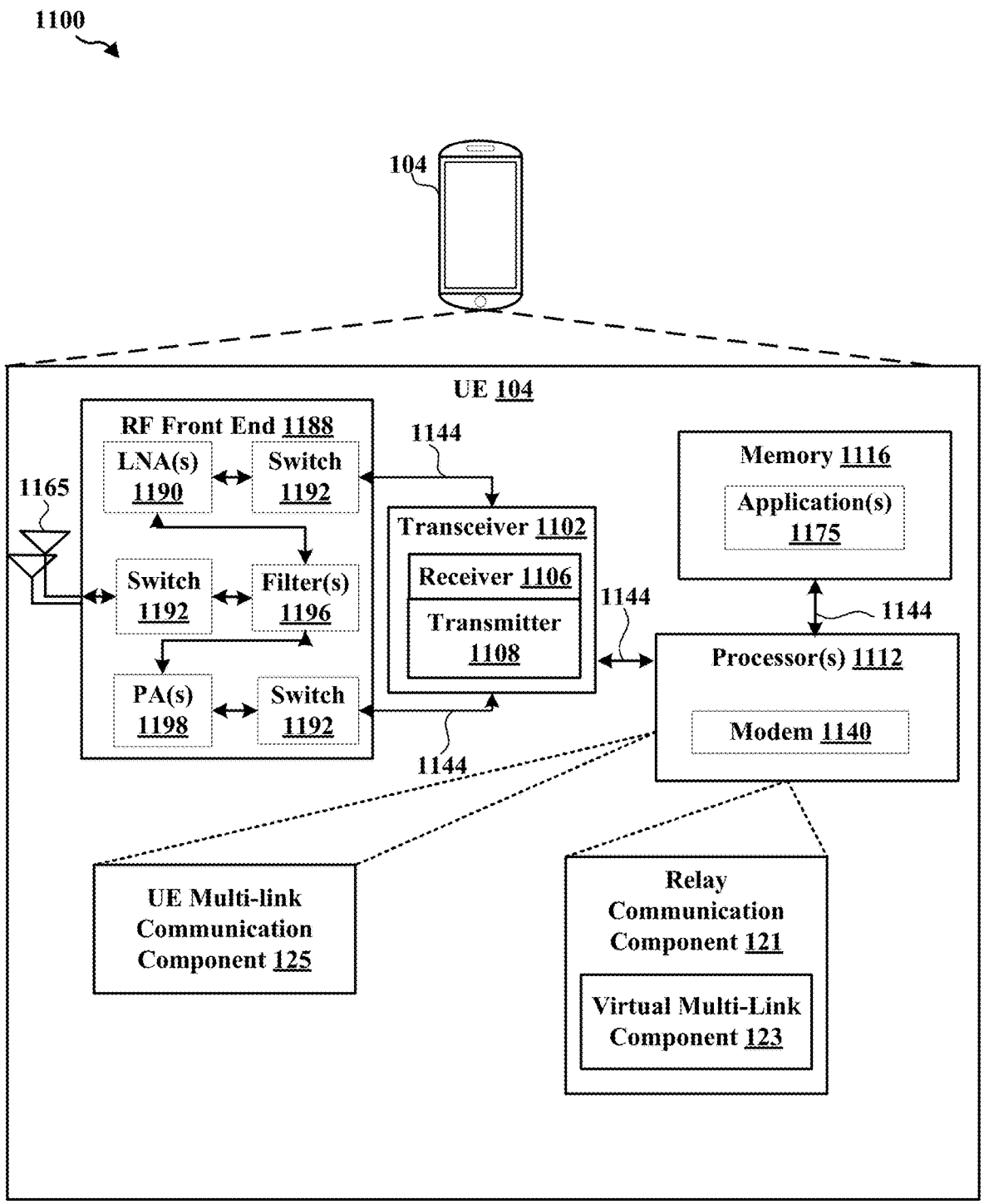
FIG. 11 is a block diagram of an example UE, in accordance with various aspects of the present disclosure.

Referring to FIG. 9, an example method 900 of wireless communication may be performed by the relay UE 104b, which may include one or more components as discussed in FIG. 1, 4, or 11, and which may operate according to the virtual multi-link component 123 as discussed above with regard to FIGS. 5-8.

At 902, method 900 includes receiving, from a base station, a grant for one or both of one or more access link resources or one or more sidelink resources. For example, in an aspect, the relay UE 104*b* may operate one or any combination of antennas 1165, RF front end 1188, transceiver 1102, processor 1112, memory 1116, modem 1140, or relay communication component 121 to receive, from a base station 102, a grant for one or both of one or more access link resources or one or more sidelink resources. For example, any of the above components may include receiving, from a base station, a grant for one or both of one or more access link resources or one or more sidelink resources.

At 904, method 900 includes receiving data from at least one of the base station on an access link using the one or more access link resources, or a UE on a sidelink using the one or more sidelink resources. For example, in an aspect, the relay UE 104*b* may operate one or any combination of antennas 1165, RF front end 1188, transceiver 1102, processor 1112, memory 1116, modem 1140, or relay communication component 121 to receive data from at least one of the base station on an access link using the one or more access link resources, or a UE on a sidelink using the one or more sidelink resources. For example, any of the above components may include receiving data from at least one of the base station on an access link using the one or more access link resources, or a UE on a sidelink using the one or more sidelink resources.

At 906, method 900 includes forwarding the data to at least one of the UE using the one or more sidelink resources when received from the base station on the access link using the one or more access link resources, or the base station using the one or more access link resources when received from the UE on the sidelink using the one or more sidelink resources. For example, in an aspect, the relay UE 104*b* may operate one or any combination of antennas 1165, RF front end 1188, transceiver 1102, processor 1112, memory 1116, modem 1140, or relay communication component 121 to forward the data to at least one of the UE using the one or more sidelink resources when received from the base station on the access link using the one or more access link resources, or the base station using the one or more access link resources when received from the UE on the sidelink using the one or more sidelink resources.

In some implementations, method 900 may further include determining whether data received on the access link has been successfully decoded, forwarding the data based on determining that the data received on the access link has been successfully decoded, and forgoing forwarding of the data based on determining that the data received on the access link has not been successfully decoded.

In some implementations, method 900 may further include transmitting a failure indication within sidelink control information to at least one of the UE or the base station.

In some implementations, receiving the grant may include receiving, on a PSCCH, the grant from the base station.

In some implementations, the one or more access link resources and the one or more sidelink resources may be offset in a time domain.

In some implementations, the one or more sidelink resources may include at least one resource for sidelink control information.

In some implementations, the relay node facilitates multi-link communication between the base station and the UE having a single antenna panel.

In some implementations, the relay node may serve as an additional virtual antenna panel for the UE.

In some implementations, the one or more access link resources may facilitate communication on a Uu interface.

In some implementations, the one or more sidelink resources may facilitate communication on a PC5 interface.

Figure 12:
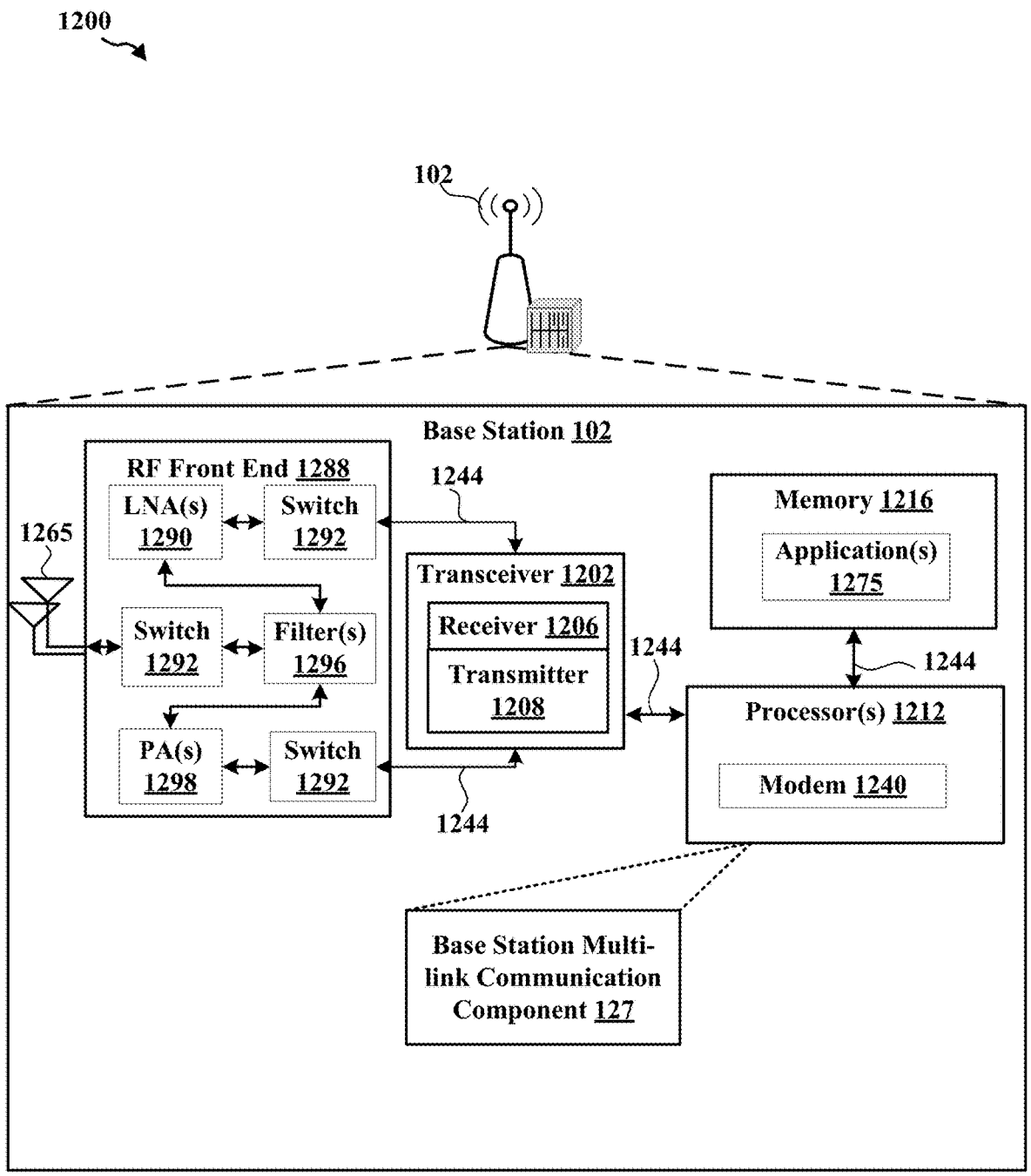
FIG. 12 is a block diagram of an example base station, in accordance with various aspects of the present disclosure.

Referring to FIG. 10, an example method 1000 of wireless communication may be performed by the base station 102, which may include one or more components as discussed in FIG. 1, 4, or 12, and which may operate according to the base station multi-link communication component 127, as discussed above with regard to FIG. 8.

At 1002, method 1000 includes determining, for a UE, QCL information and a grant for one or both of one or more access link resources or one or more sidelink resources. For example, in an aspect, the base station 102 may operate one or any combination of antennas 1265, RF front end 1288, transceiver 1202, processor 1212, memory 1216, modem 1240, or base station multi-link communication component 127 to determine, for a UE, QCL information and a grant for one or both of one or more access link resources or one or more sidelink resources. For example, any of the above components may include determining, for a UE, QCL information and a grant for one or both of one or more access link resources or one or more sidelink resources.

At 1004, method 1000 includes transmitting, to the UE, the QCL information and the grant on a downlink communication channel. For example, in an aspect, the base station 102 may operate one or any combination of antennas 1265, RF front end 1288, transceiver 1202, processor 1212, memory 1216, modem 1240, or base station multi-link communication component 127 to transmit, to the UE, the QCL information and the grant on a downlink communication channel. For example, any of the above components may include encoding and decoding algorithms for transmitting, to the UE, the QCL information and the grant on a downlink communication channel.

In other implementations, the QCL information may indicate one or more beams to be used for one or both of access link or sidelink communication.

In some implementations of method 1000, the QCL information may indicate one or more QCL resources corresponding to one more access link reference signals, sidelink reference signals, or a combination thereof.

In some implementations, the QCL information may indicates a relay node identifier.

In some implementations, the QCL information may indicate a sequence of joint TCI states for combined beam and sidelink sweeping.

Referring to FIG. 11, one example of an implementation of UE 104, including relay UE 104*b* and/or sidelink-assisted multi-link UE 104*a*, may include a variety of components, some of which have already been described above and are described further herein, including components such as one or more processors 1112 and memory 1116 and transceiver 1102 in communication via one or more buses 1144, which may operate in conjunction with modem 1140 and/or configuration component 198 for communicating sidelink capability information.

In an aspect, the one or more processors 1112 can include a modem 1140 and/or can be part of the modem 1140 that uses one or more modem processors. Thus, the various functions related to configuration component 198 may be included in modem 1140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1140 associated with configuration component 198 may be performed by transceiver 1102.

Also, memory 1116 may be configured to store data used herein and/or local versions of applications 1175 or communicating component 1142 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be anon-transitory computer-readable storage medium that stores one or more computer-executable codes defining UE multi-link communication 125 and/or relay communication component 121 and/or one or more of its subcomponents, and/or data associated therewith, when UE 104 is operating at least one processor 1112 to execute multi-link communication 125 and/or relay communication component 121 and/or one or more of its subcomponents.

Transceiver 1102 may include at least one receiver 1106 and at least one transmitter 1108. Receiver 1106 may include hardware and/or software executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware and/or software executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. The one or more antennas 1165 may include one or more antenna panels and/or sub-arrays, such as may be used for beamforming. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1140 can configure transceiver 1102 to operate at a specified frequency and power level based on the UE configuration of the UE 104 and the communication protocol used by modem 1140.

In an aspect, modem 1140 can be a multiband-multimode modem, which can process digital data and communicate with transceiver 1102 such that the digital data is sent and received using transceiver 1102. In an aspect, modem 1140 can be multiband and be configured to support multiple frequency bands for a specific communications protocol. In an aspect, modem 1140 can be multimode and be configured to support multiple operating networks and communications protocols. In an aspect, modem 1140 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1112 may correspond to one or more of the processors described in connection with the UE in FIG. 4. Similarly, the memory 1116 may correspond to the memory described in connection with the UE in FIG. 4.

Referring to FIG. 12, one example of an implementation of base station 102 (e.g., a base station 102, 102a, and/or 102b, as described above) may include a variety of components, some of which have already been described above, but including components such as one or more processors 1212 and memory 1216 and transceiver 1202 in communication via one or more buses 1244, which may operate in conjunction with modem 1240 and base station multi-link communication component 127.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

In an aspect, the processor(s) 1212 may correspond to one or more of the processors described in connection with the base station in FIG. 4. Similarly, the memory 1216 may correspond to the memory described in connection with the base station in FIG. 4.

Some Further Examples

In one example, a method of wireless communications by a relay node comprises receiving, from a base station, a grant for one or both of one or more access link resources or one or more sidelink resources; receiving data from at least one of: the base station on an access link using the one or more access link resources, or a UE on a sidelink using the one or more sidelink resources; and forwarding the data to at least one of: the UE using the one or more sidelink resources when received from the base station on the access link using the one or more access link resources, or the base station using the one or more access link resources when received from the UE on the sidelink using the one or more sidelink resources.

One or more of the above examples can further include determining whether data received on the access link has been successfully decoded; forwarding the data based on determining that the data received on the access link has been successfully decoded; and forgoing forwarding of the data based on determining that the data received on the access link has not been successfully decoded.

One or more of the above examples can further include transmitting a failure indication within sidelink control information to at least one of the UE or the base station.

One or more of the above examples can further include receiving the grant includes receiving, on a PDCCH, the grant from the base station.

One or more of the above examples can further include wherein the one or more access link resources and the one or more sidelink resources are offset in a time domain.

One or more of the above examples can further include wherein the one or more sidelink resources include at least one resource for sidelink control information.

One or more of the above examples can further include wherein the relay node facilitates multi-link communication between the base station and the UE having a single antenna panel.

One or more of the above examples can further include wherein the relay node serves as an additional virtual antenna panel for the UE.

One or more of the above examples can further include wherein the one or more access link resources facilitate communication on a cellular (Uu) interface.

One or more of the above examples can further include wherein the one or more sidelink resources facilitate communication on a ProSe sidelink (PC5) interface.

In another example, a method of wireless communications by a base station, comprises determining, for a UE, QCL information and a grant for one or both of one or more access link resources or one or more sidelink resources; and transmitting, to the UE, the QCL information and the grant on a downlink communication channel.

One or more of the above examples can further include wherein the QCL information indicates one or more beams to be used for one or both of access link or sidelink communication.

One or more of the above examples can further include wherein the QCL information indicates one or more QCL resources corresponding to one more access link reference signals, sidelink reference signals, or a combination thereof.

One or more of the above examples can further include wherein the QCL information indicates a relay node identifier.

One or more of the above examples can further include wherein the QCL information indicates a sequence of joint TCI states for combined beam and sidelink sweeping.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a relay node, comprising:
receiving, from a base station and via an aggregated slot on a physical downlink control channel (PDCCH), a semi-persistent or dynamic grant for one or more access link resources and one or more sidelink resources that are offset in a time domain, wherein the relay node represents a virtual antenna panel for a user equipment (UE) having a single antenna panel to facilitate multi-link communication between the base station and the UE;
receiving data from at least one of:

the base station on an access link using the one or more access link resources, or the UE on a sidelink using the one or more sidelink resources; and forwarding the data to at least one of:
the UE using the one or more sidelink resources when received from the base station on the access link using the one or more access link resources, or the base station using the one or more access link resources when received from the UE on the sidelink using the one or more sidelink resources.

2. The method of claim 1, further comprising:
determining whether data received on the access link has been successfully decoded;

forwarding the data based on determining that the data received on the access link has been successfully decoded; and forgoing forwarding of the data based on determining that the data received on the access link has not been successfully decoded.

3. The method of claim 2, further comprising transmitting a failure indication within sidelink control information to at least one of the UE or the base station.

4. The method of claim 1, wherein the one or more sidelink resources include at least one resource for sidelink control information.

5. The method of claim 1, wherein the one or more access link resources facilitate communication on a cellular (Uu) interface.

6. The method of claim 1, wherein the one or more sidelink resources facilitate communication on a ProSe sidelink (PC5) interface.

7. A relay node device for wireless communication, comprising:
a memory configured to store instructions; and
at least one processor communicatively coupled with the memory, wherein the at least one processor is configured to:
receive, from a base station and via an aggregated slot on a physical downlink control channel (PDCCH), a semi-persistent or dynamic grant for one or more access link resources and one or more sidelink resources that are offset in a time domain, wherein the relay node represents a virtual antenna panel for a user equipment (UE) having a single antenna panel to facilitate multi-link communication between the base station and the UE;
receive data from at least one of:
the base station on an access link using the one or more access link resources, or
the UE on a sidelink using the one or more sidelink resources; and
forwarding the data to at least one of:
the UE using the one or more sidelink resources when received from the base station on the access link using the one or more access link resources, or
the base station using the one or more access link resources when received from the UE on the sidelink using the one or more sidelink resources.

8. The relay node of claim 7, wherein the processor is further to:
determine whether data received on the access link has been successfully decoded;

forward the data based on determining that the data received on the access link has been successfully decoded; and forgo forwarding of the data based on determining that the data received on the access link has not been successfully decoded.

9. The relay node of claim 8, wherein the processor is further to transmit a failure indication within sidelink control information to at least one of the UE or the base station.

10. The relay node of claim 7, wherein the one or more sidelink resources include at least one resource for sidelink control information.

11. The relay node of claim 7, wherein the one or more access link resources facilitate communication on a cellular (Uu) interface.

12. The relay node of claim 7, wherein the one or more sidelink resources facilitate communication on a ProSe sidelink (PC5) interface.

13. A relay node device for wireless communication, comprising:
means for receiving, from a base station and via an aggregated slot on a physical downlink control channel (PDCCH), a semi-persistent or dynamic grant for one or more access link resources and one or more sidelink resources that are offset in a time domain, wherein the relay node represents a virtual antenna panel for a user equipment (UE) having a single antenna panel to facilitate multi-link communication between the base station and the UE;
means for receiving data from at least one of:
the base station on an access link using the one or more access link resources, or
the UE on a sidelink using the one or more sidelink resources; and forwarding the data to at least one of:
the UE using the one or more sidelink resources when received from the base station on the access link using the one or more access link resources, or
the base station using the one or more access link resources when received from the UE on the sidelink using the one or more sidelink resources.

14. The relay node device of claim 13, further comprising:
means for determining whether data received on the access link has been successfully decoded;
means for forwarding the data based on determining that the data received on the access link has been successfully decoded; and
means for forgoing forwarding of the data based on determining that the data received on the access link has not been successfully decoded.

15. The relay node device of claim 14, further comprising means for transmitting a failure indication within sidelink control information to at least one of the UE or the base station.

16. The method of claim 13, wherein the one or more sidelink resources include at least one resource for sidelink control information.

17. The relay node device of claim 13, wherein the one or more access link resources facilitate communication on a cellular (Uu) interface.

18. The relay node device of claim 13, wherein the one or more sidelink resources facilitate communication on a ProSe sidelink (PC5) interface.

* * * * *